US012387648B2

(12) United States Patent
Deng

(10) Patent No.: US 12,387,648 B2
(45) Date of Patent: Aug. 12, 2025

(54) DISPLAY MODULE, CONTROL METHOD THEREOF, AND DISPLAY DEVICE

(71) Applicant: Guangzhou China Star Optoelectronics Semiconductor Display Technology Co., LTd., Guangdong (CN)

(72) Inventor: Huayan Deng, Guangdong (CN)

(73) Assignee: Guangzhou China Star Optoelectronics Semiconductor Display Technology Co., LTd., Guangzhou (CN)

( * ) Notice: Subject to any disclaimer, the term of this patent is extended or adjusted under 35 U.S.C. 154(b) by 0 days.

(21) Appl. No.: 18/806,714

(22) Filed: Aug. 16, 2024

(65) Prior Publication Data

US 2025/0061830 A1 Feb. 20, 2025

(30) Foreign Application Priority Data

Aug. 16, 2023 (CN) ......................... 202311037428.9

(51) Int. Cl.
*G09G 3/20* (2006.01)

(52) U.S. Cl.
CPC ....... *G09G 3/20* (2013.01); *G09G 2300/0842* (2013.01); *G09G 2310/0275* (2013.01); *G09G 2310/08* (2013.01); *G09G 2354/00* (2013.01)

(58) Field of Classification Search
CPC ............. G09G 3/20; G09G 2300/0842; G09G 2310/0275; G09G 2310/08; G09G 2354/00
See application file for complete search history.

(56) References Cited

U.S. PATENT DOCUMENTS

| | | | | |
|---|---|---|---|---|
| 10,089,934 | B2 * | 10/2018 | Nam | G09G 3/3283 |
| 2018/0232095 | A1 * | 8/2018 | Ikeda | G06F 3/044 |
| 2018/0233082 | A1 * | 8/2018 | Wang | G09G 3/3233 |
| 2018/0233099 | A1 * | 8/2018 | Wang | G09G 3/3677 |
| 2018/0233209 | A1 * | 8/2018 | Ma | G11C 19/28 |
| 2018/0239488 | A1 * | 8/2018 | Lin | G06F 3/0443 |
| 2018/0240399 | A1 * | 8/2018 | Lin | G09G 3/32 |
| 2018/0240414 | A1 * | 8/2018 | Yang | G09G 3/3648 |
| 2018/0240422 | A1 * | 8/2018 | Omura | G09G 3/3614 |
| 2018/0261150 | A1 * | 9/2018 | Tamura | G09G 3/2074 |
| 2018/0267664 | A1 * | 9/2018 | Mu | G09G 3/3674 |
| 2018/0268772 | A1 * | 9/2018 | Teng | G09G 3/3696 |

* cited by examiner

*Primary Examiner* — Sejoon Ahn
(74) *Attorney, Agent, or Firm* — PV IP PC; Wei Te Chung

(57) ABSTRACT

A display module and a control method thereof, as well as a display device. The display module includes a display panel, a control module, a selection module, and a storage module. The storage module includes a first storage unit and a second storage unit. The control module is electrically connected to the display panel, the selection module, and the storage module. The selection module receives a reference write protection signal generated by the control module and outputs a selection control signal. The control module, based on a reference clock signal and a reference data signal generated by the control module and the selection control signal, execute one or more instructions stored in the first storage unit to enable a sensing function of the display panel, or execute one or more instructions stored in the second storage unit to disable the sensing function of the display panel.

11 Claims, 4 Drawing Sheets

DISPLAY MODULE, CONTROL METHOD THEREOF, AND DISPLAY DEVICE

CROSS-REFERENCE TO RELATED APPLICATION

This application claims priority to and the benefit of Chinese Patent Application No. 202311037428.9, filed on Aug. 16, 2023, the disclosure of which is incorporated herein by reference in its entirety.

TECHNICAL FIELD

The present disclosure relates to the field of display technology, and more particularly, to a display module, a control method thereof, and a display device.

BACKGROUND

The proportion of built-in touch control products in the current mobile display terminal customer application market is slowly increasing. Limited by costs and the lack of commonality between touch-enabled and non-touch-enabled functions, display terminal manufacturers are unable to turn off the touch-enabled functions that come with touch-enabled display modules during production. This leads to the need for both touch-enabled and non-touch-enabled display modules when manufacturers fabricate display terminals with and without touch-enabled functions, respectively. The application scenarios for display modules are singular, and this does not favor cost control.

SUMMARY

An embodiment of the present disclosure provides a display module including a display panel, a control module, a selection module, and a storage module. The control module is electrically connected to the display panel, and the control module is configured to output a reference clock signal, a reference data signal, and a reference write protection signal. The selection module is electrically connected to the control module, and the selection module is configured to receive the reference write protection signal to output a selection control signal. The storage module is electrically connected to the selection module and the control module, the storage module includes a first storage unit and a second storage unit, and the storage module is configured to receive the selection control signal. Herein, the control module is configured to select, based on the selection control signal, the reference clock signal, and the reference data signal, to execute one or more instructions stored in the first storage unit to enable a sensing function of the display panel, or to execute one or more instructions stored in the second storage unit to disable a sensing function of the display panel.

An embodiment of the present disclosure further provides a control method for a display module for controlling any one of the above-described display modules, including: outputting, by the selection module, a selection control signal based on the reference write protection signal generated by the control module; executing, by the control module, the instructions stored in the first storage unit or the second storage unit to enable or disable the sensing function of the display panel based on the reference clock signal and the reference data signal generated by the control module and the selection control signal.

An embodiment of the present disclosure further provides a display device including the display module described above.

BRIEF DESCRIPTION OF THE DRAWINGS

To more clearly illustrate the technical solutions in the examples of the present invention, a brief introduction will now be given to the drawings required in the description of the examples. It is obvious that the drawings described below are merely some examples of the present invention. For technicians in this field, it is possible to obtain other drawings based on these without the need for creative effort.

DETAILED DESCRIPTION

Below, the technical solutions in the embodiments of the present disclosure will be described clearly and completely with reference to the drawings of the embodiments of the present disclosure. It is evident that the described embodiments are merely some embodiments of the present disclosure, not all them. All other embodiments obtained by a person of ordinary skill in the art, without the premise of creative labor based on the embodiments in the present disclosure, fall within the scope of protection of the present disclosure. In addition, it should be understood that the specific implementations described here is only used to illustrate and explain the present disclosure and does not intend to limit the present disclosure. In the present disclosure, unless otherwise indicated, directional terms such as "up" and "down" usually refer to the up and down in an actual usage or operational status of a device, specifically to directions in the figures of the accompanied drawings; while terms such as "inside" and "outside" are in reference to an outline of the device.

In the description of the present disclosure, it is to be understood that the terms "first", "second" and the like are used for descriptive purposes only and are not to be construed as indicating or implying relative importance or implying the number of indicated technical features. Thus, features defined as "first" and "second" may explicitly or implicitly include one or more of the described features. In the description of present disclosure, "plural" means two or more, unless expressly and specifically defined otherwise. "Electrical connection" means that there is conductivity between the two, without limitation to being directly or indirectly connected.

In addition, it should also be noted that the drawings provided only depict structures and steps closely related to the present disclosure, omitting some details that are not relevant to the present disclosure. The purpose is to simplify the drawings and make the essential points of the present disclosure clear, rather than indicating that an actual device must be identical to the drawings. The drawings are not intended to limit the actual implementation of the device.

It will be understood by the skilled person in the art that modifications or equivalent substitutions may be made to embodiments of the present disclosure without departing from the spirit and scope of the present disclosure, and that such modifications or equivalent substitutions are intended to be included within the scope of the present disclosure. Also, each embodiment may be combined with others but will not be redundantly described individually.

Embodiments of the present disclosure provide a display module and a display device, which can improve the issue of singular application scenarios of the display module caused by the lack of commonality between touch-enabled functions and non-touch-enabled functions.

Figure 1:
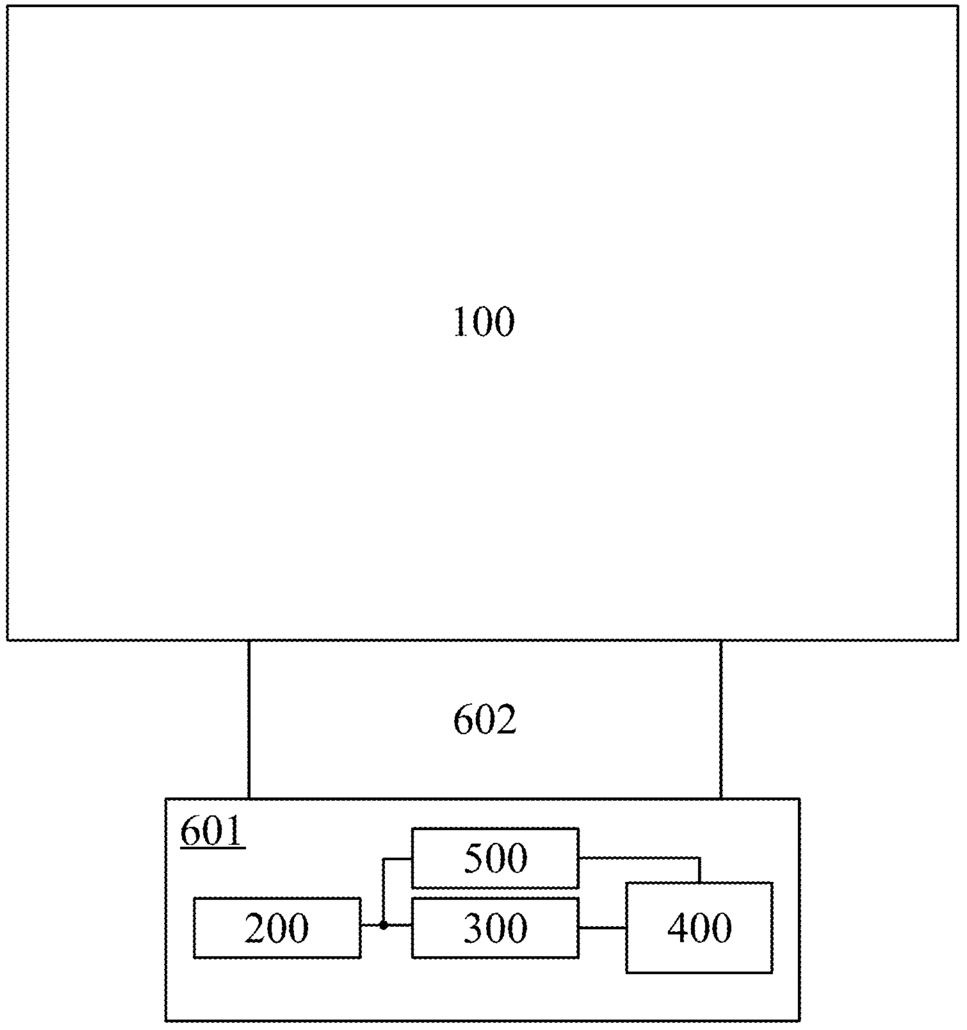
FIG. 1 is a schematic diagram of a structure of a display module according to an embodiment of the present disclosure.

Specifically, FIG. 1 is a schematic diagram of a structure of a display module according to an embodiment of the present disclosure. An embodiment of the present disclosure provides a display module including a display panel 100 and a drive module.

Alternatively, the display panel 100 includes a passive light-emitting display panel (such as a liquid crystal display panel), and a self-emitting display panel (such as a display panel including a light-emitting device such as an organic light-emitting diode, a sub-millimeter light-emitting diode, or a micro light-emitting diode).

Alternatively, the display panel 100 includes one or more sensing elements so that the display panel 100 can implement sensing functions (such as a touch-enabled function, a fingerprint recognition function, a photography function, a face recognition function, a temperature sensing function, a distance sensing function, and the like).

Alternatively, the display panel 100 includes one or more touch electrodes that can be used to enable the display panel 100 to perform touch-enabled functions. Alternatively, the display panel 100 includes one or more photosensitive elements so that the display panel 100 can implement a fingerprint recognition function. Alternatively, the display panel 100 includes a camera so that the display panel 100 can implement a photography function. Alternatively, the display panel 100 includes a camera, a light sensor, a distance sensor, and the like, so that the display panel 100 can implement a face recognition function.

It will be appreciated that the structural configuration of the display panel 100 for implementing functions such as a touch-enabled function, a fingerprint recognition function, a photography function, a face recognition function, a temperature sensing function, and a distance sensing function may be set in accordance with existing technologies.

Still referring to FIG. 1, the drive module is electrically connected to the display panel 100, and the drive module is configured to control the display panel 100 to realize a display function and a sensing function.

Figure 2A:
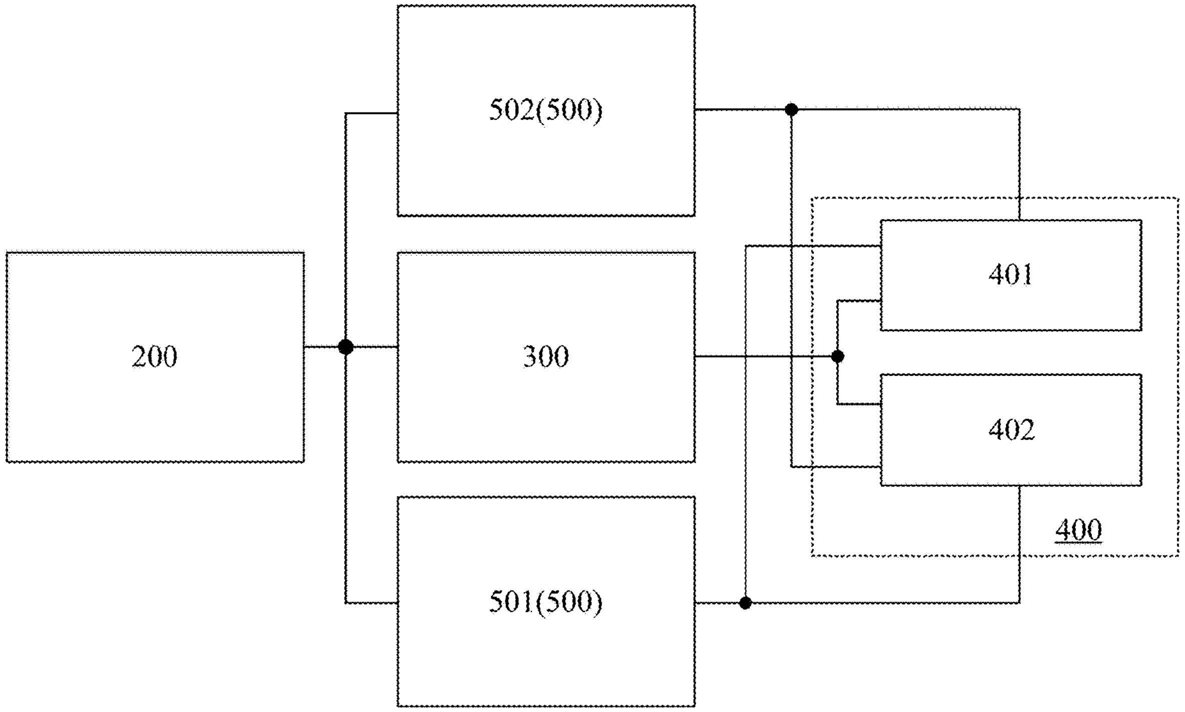
FIGS. 2A and 2B are schematic diagrams illustrating the structural connections of a control module, a selection module, and a storage module according to an embodiment of the present disclosure.
Figure 2B:
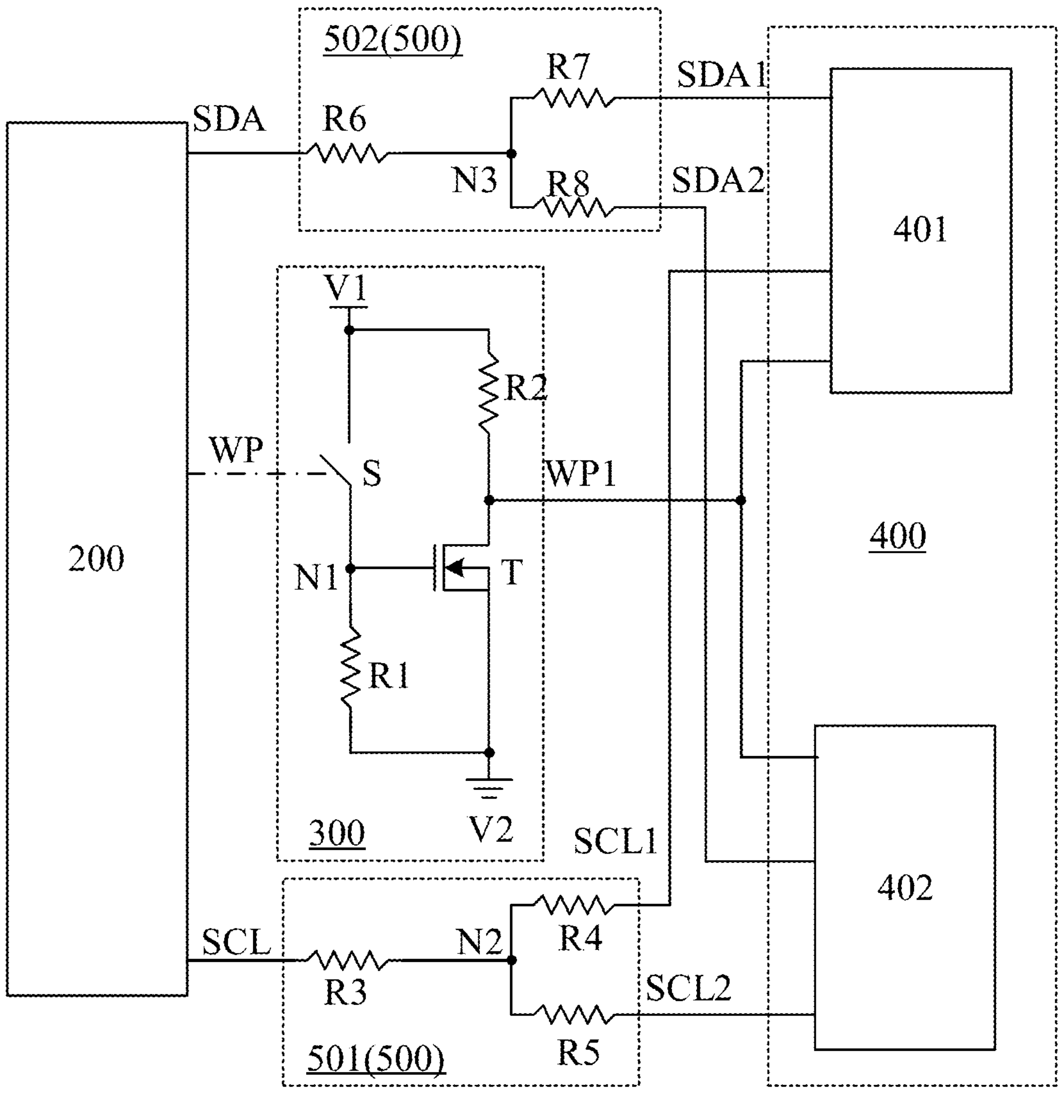

Alternatively, the drive module includes a control module 200, a selection module 300, and a storage module 400. FIGS. 2A and 2B are schematic diagrams illustrating the structural connections of a control module, a selection module, and a storage module according to an embodiment of the present disclosure.

The control module 200 is electrically connected to the display panel 100, and is configured to output a reference clock signal SCL, a reference data signal SDA, and a reference write protection signal WP.

Alternatively, the control module 200 includes a timing controller. Alternatively, the control module 200 may generate the reference write protection signal WP through external switch control according to usage requirements. The reference clock signal SCL and the reference data signal SDA are signals in an Inter Integrated Circuit (IIC) transmission format.

The selection module 300 is electrically connected to the control module 200, and the selection module 300 is configured to receive the reference write protection signal WP to output a selection control signal WP1. Herein, the control module 200 is configured to control whether the display panel 100 enables a sensing function based on the selection control signal WP1.

Alternatively, the control module 200 may also be configured to control whether the display panel 100 switches a sensing function based on the selection control signal WP1.

It should be noted that the reference write protection signal WP received by the selection module 300 may be output from any one of output pins of the timing controller (that is, the reference write protection signal WP may be multiplexed with a certain signal output by the timing controller, or may be a signal output specifically to fulfill whether or not the sensing function of the display panel 100 is enabled or switched) to fulfill control of whether or not the sensing function of the display panel 100 is enabled or switched.

Referring still to FIGS. 2A and 2B, the memory module 400 is electrically connected to the selection module 300 and the control module 200, the memory module 400 includes a first memory unit 401 and a second memory unit 402, and the memory module 400 is configured to receive the selection control signal WP1.

Alternatively, the first storage unit 401 stores one or more instructions for enabling the sensing function of the display panel 100, and the second storage unit 402 stores one or more instructions for disabling the sensing function of the display panel 100, or the instructions stored in the second storage unit 402 do not include the instructions for enabling the sensing function of the display panel 100 (that is, the second storage unit 402 does not store one or more instructions for enabling the sensing function of the display panel 100).

Alternatively, the first storage unit 401 includes a first non-volatile memory and the second storage unit 402 includes a second non-volatile memory. Alternatively, the first non-volatile memory and the second non-volatile memory each include a one or more flash memories. Alternatively, the first non-volatile memory and the second non-volatile memory may each employ devices of model FM25Q08A-SO-T-G.

Alternatively, the first non-volatile memory stores one or more instructions for enabling the touch-enabled function of the display panel 100, and the second non-volatile memory stores one or more instructions that do not include those enabling the touch-enabled function of the display panel 100 or stores one or more instructions for disabling the touch-enabled function of the display panel 100.

Alternatively, the first non-volatile memory is configured to store one or more instructions for enabling at least one of a fingerprint recognition function, a face recognition function, a photography function, a temperature sensing function, a distance sensing function, and the like of the display panel 100, and the second non-volatile memory is configured not to store the instructions for enabling at least one respective sensing function or to store one or more instructions for disabling the respective sensing function(s).

Alternatively, the first storage unit 401 is configured to store one or more instructions for enabling one of a touch-enabled function, a fingerprint recognition function, a face recognition function, a photography function, a temperature sensing function, a distance sensing function, and the like of the display panel 100, and the second non-volatile memory is configured to store one or more instructions for enabling another one of the touch-enabled function, the fingerprint recognition function, the face recognition function, the photography function, the temperature sensing function, the distance sensing function, and the like, so that the display panel 100 can perform switching of different sensing functions (even if the display panel 100 is switched from one sensing function to another sensing function).

With continued reference to FIGS. 2A and 2B, the control module 200 may execute the instructions stored in the first storage unit 401 and the instructions stored in the second storage unit 402 so that the display panel 100 enables or disables or switches the sensing function(s).

Alternatively, the control module 200 is configured to select to execute the instructions stored in the first storage unit 401 to enable the sensing function(s) of the display panel 100 based on the selection control signal WP1, the reference clock signal SCL, and the reference data signal SDA, or to select to execute the instructions stored in the second storage unit 402 to disable the sensing function(s) of the display panel 100.

Alternatively, the control module 200 is configured to select to execute instructions stored in the first storage unit 401 to enable a sensing function of the display panel 100 based on the selection control signal WP1, the reference clock signal SCL, and the reference data signal SDA, or to select to execute instructions stored in the second storage unit 402 to enable another sensing function of the display panel 100.

The present disclosure provides a display module and a control method thereof, as well as a display device. The display module includes a display panel, a control module, a selection module, and a storage module. The storage module includes a first storage unit and a second storage unit. The control module is electrically connected to the display panel, the selection module, and the storage module. The selection module receives a reference write protection signal generated by the control module and outputs a selection control signal. The control module, based on a reference clock signal and a reference data signal generated by the control module and the selection control signal, selects to execute one or more instructions stored in the first storage unit to enable a sensing function of the display panel, or selects to execute one or more instructions stored in the second storage unit to disable the sensing function of the display panel. This allows the display module to optionally enable and disable the sensing function, which helps to expand the application scenarios of the display module and facilitates cost control.

Alternatively, with continued reference to FIGS. 2A and 2B, the selection module 300 includes a first switch S, a first transistor T, a first resistor R1, and a second resistor R2.

An input terminal of the first switch S is electrically connected to a first power supply terminal V1, an output terminal of the first switch S is electrically connected to a first node N1, and the first switch S is configured to connect or disconnect an electrical connection between the first power supply terminal V1 and the first node N1 based on the reference write protection signal WP.

Alternatively, in some embodiments, the first switch S may also be configured to be directly controlled in accordance with external requirements, followed by the control module 200 being caused to select to execute the instructions stored in the first storage unit 401 or the instructions stored in the second storage unit 402 based on the selection control signal WP1 generated by the selection module 300 in conjunction with the reference data signal SDA and the reference clock signal SCL.

Alternatively, the first switch S may be in the form of a transistor, that is, the input terminal of the first switch S is electrically connected to the first power supply terminal V1, the output terminal of the first switch S is electrically connected to the first node N1, and a control terminal of the first switch S receives the reference write protection signal WP or an incoming signal by external demands.

An input terminal of the first transistor T is electrically connected to a second power supply terminal V2, an output terminal of the first transistor T is electrically connected to the storage module 400, and a control terminal of the first transistor T is electrically connected to the first node N1.

The first resistor R1 is connected in series between the control terminal of the first transistor T and the second power supply terminal V2, and the second resistor R2 is connected in series between the output terminal of the first transistor T and the first power supply terminal V1.

Alternatively, a voltage supplied from the first power supply terminal V1 is greater than a voltage supplied from the second power supply terminal V2.

Alternatively, the selection control signal WP1 has a first level state under a condition that the first switch S is open and a second level state under a condition that the first switch S is closed. Herein, under a condition that the selection control signal WP1 has the first level state, the control module 200 is configured to execute the instructions stored in the first storage unit 401 to enable the sensing function of the display panel 100 based on the reference clock signal SCL and the reference data signal SDA. Under a condition that the selection control signal WP1 has the second level state, the control module 200 is configured to execute the instructions stored in the second storage unit 402 to disable the sensing function of the display panel 100 based on the reference clock signal SCL and the reference data signal SDA. Alternatively, the first level state may be one of a high level state and a low level state, and the second level state may be another one of the high level state and the low level state.

Alternatively, referring still to FIGS. 2A and 2B, the display module further includes a signal conversion module 500 electrically connected between the control module 200 and the storage module 400, and the signal conversion module 500 includes a clock signal conversion unit 501 and a data signal conversion unit 502.

The clock signal conversion unit 501 is configured to receive the reference clock signal SCL to generate a first clock signal SCL1 to be output to the first memory unit 401, and to generate a second clock signal SCL2 to be output to the second memory unit 402. The data signal conversion unit 502 is configured to receive the reference data signal SDA to generate a first data signal SDA1 to be output to the first storage unit 401, and to generate a second data signal SDA2 to be output to the second storage unit 402.

By setting the clock signal conversion unit 501 and the data signal conversion unit 502, the control module 200 executes the instructions stored in the first storage unit 401 to enable the sensing function of the display panel 100 based on the first level state of the selection control signal WP1, the first clock signal SCL1, and the first data signal SDA1, and the control module 200 executes the instructions stored in the second storage unit 402 to disable or switch the sensing function of the display panel 100 based on the second level state of the selection control signal WP1, the second clock signal SCL2, and the second data signal SDA2.

Alternatively, the clock signal conversion unit 501 includes a third resistor R3, a fourth resistor R4, and a fifth resistor R5. The third resistor R3 is connected in series between the control module 200 and the second node N2, the fourth resistor R4 is connected in series between the second node N2 and the first memory unit 401, and the fifth resistor R5 is connected in series between the second node N2 and the second memory unit 402. Alternatively, resistance values of the fourth resistor R4 and the fifth resistor R5 are different to provide different clock signals for the first memory unit 401 and the second memory unit 402.

Alternatively, the data signal conversion unit 502 includes a sixth resistor R6, a seventh resistor R7, and an eighth resistor R8. The sixth resistor R6 is connected in series between the control module 200 and a third node N3, the seventh resistor R7 is connected in series between the third node N3 and the first memory unit 401, and the eighth resistor R8 is connected in series between the third node N3 and the second memory unit 402. Alternatively, resistance values of the seventh resistor R7 and the eighth resistor R8 are different to provide different data signals for the first memory unit 401 and the second memory unit 402.

Alternatively, the signal conversion module 500, the memory module 400, the selection module 300, and the control module 200 may be fabricated on a same printed circuit board 601 (for example, on a horizontal circuit board of the display module), which is electrically connected to the display panel 100 through a flexible circuit board 602, as shown in FIG. 1, so as to reduce the communication complexity between modules while realizing the electrical connection to the display panel 100.

Alternatively, the drive module further includes a power supply driving chip electrically connected to the selection module 300 as the first power supply terminal V1 and the second power supply terminal V2.

Alternatively, the drive module further includes a display driving chip configured to control the display panel 100 to implement a display function.

Alternatively, the display driving chip includes a gate driving chip that outputs a plurality of gate control signals to the display panel 100 and a source driving chip that outputs a plurality of display data signals to the display panel 100 to control a plurality of sub-pixels to display a corresponding picture.

Alternatively, at least one module or chip of the drive module may be fabricated on the display panel 100 using integrated Chip On Glass (COG).

Figure 3:
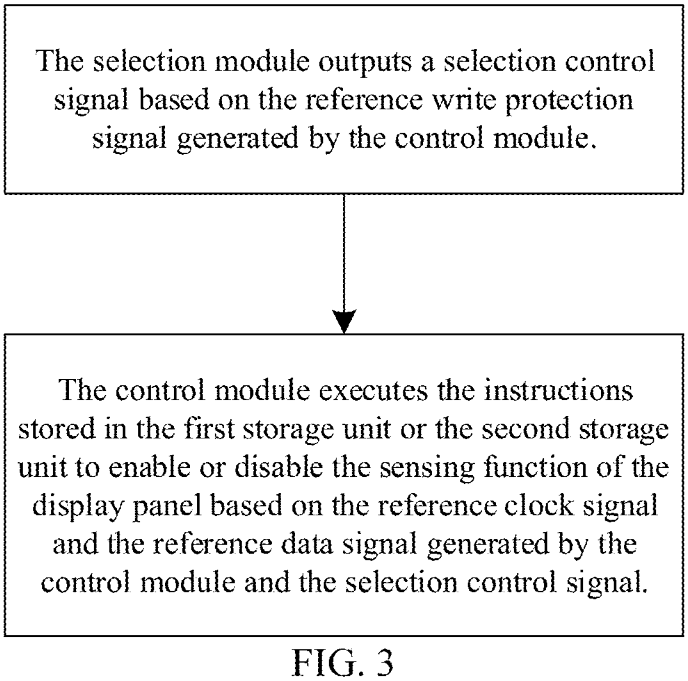
FIG. 3 is a flowchart of a control method for a display module according to an embodiment of the present disclosure.

FIG. 3 is a flowchart of a control method for a display module according to an embodiment of the present disclosure. An embodiment of the present disclosure further provides a control method for a display module for controlling any one of the display modules described above. The control method for the display module includes the following operations.

The selection module 300 outputs a selection control signal WP1 based on the reference write protection signal WP generated by the control module 200.

The control module 200 executes the instructions stored in the first storage unit 401 or the second storage unit 402 to enable or disable the sensing function of the display panel 100 based on the reference clock signal SCL and the reference data signal SDA generated by the control module 200 and the selection control signal WP1.

Alternatively, the operation of the control module 200 executing the instructions stored in the first storage unit 401 or the second storage unit 402 to enable or disable the sensing function of the display panel 100 based on the reference clock signal SCL and the reference data signal SDA generated by the control module 200 and the selection control signal WP1 includes the following operations.

Under a condition that the selection control signal WP1 has the first level state, the control module 200 executes the instructions stored in the first storage unit 401 to enable the sensing function of the display panel 100 based on the reference clock signal SCL and the reference data signal SDA;

Under a condition that the selection control signal WP1 has the second level state, the control module 200 executes the instructions stored in the second storage unit 402 to disable the sensing function of the display panel 100 based on the reference clock signal SCL and the reference data signal SDA.

Alternatively, the reference data signal SDA is converted into the first data signal SDA1 and the second data signal SDA2 by the data signal conversion unit 502, and the reference clock signal SCL is converted into the first clock signal SCL1 and the second clock signal SCL2 by the clock signal conversion unit 501. The control module 200 executes the instructions stored in the first storage unit 401 to enable the sensing function of the display panel 100 based on the first level state of the selection control signal WP1, the first clock signal SCL1, and the first data signal SDA1. The control module 200 executes the instructions stored in the second storage unit 402 to disable the sensing function of the display panel 100 based on the second level state of the selection control signal WP1, the second clock signal SCL2, and the second data signal SDA2.

Alternatively, the control module 200 executes the instructions stored in the first storage unit 401 or the second storage unit 402 to switch the sensing function of the display panel 100 based on the reference clock signal SCL and the reference data signal SDA generated by the control module 200 and the selection control signal WP1.

Alternatively, the control module 200 executes the instructions stored in the first storage unit 401 to enable a sensing function of the display panel 100 based on the first level state of the selection control signal WP1, the first clock signal SCL1, and the first data signal SDA1. The control module 200 executes the instructions stored in the second storage unit 402 to enable another sensing function of the display panel 100 based on the second level state of the selection control signal WP1, the second clock signal SCL2, and the second data signal SDA2.

Figure 4:
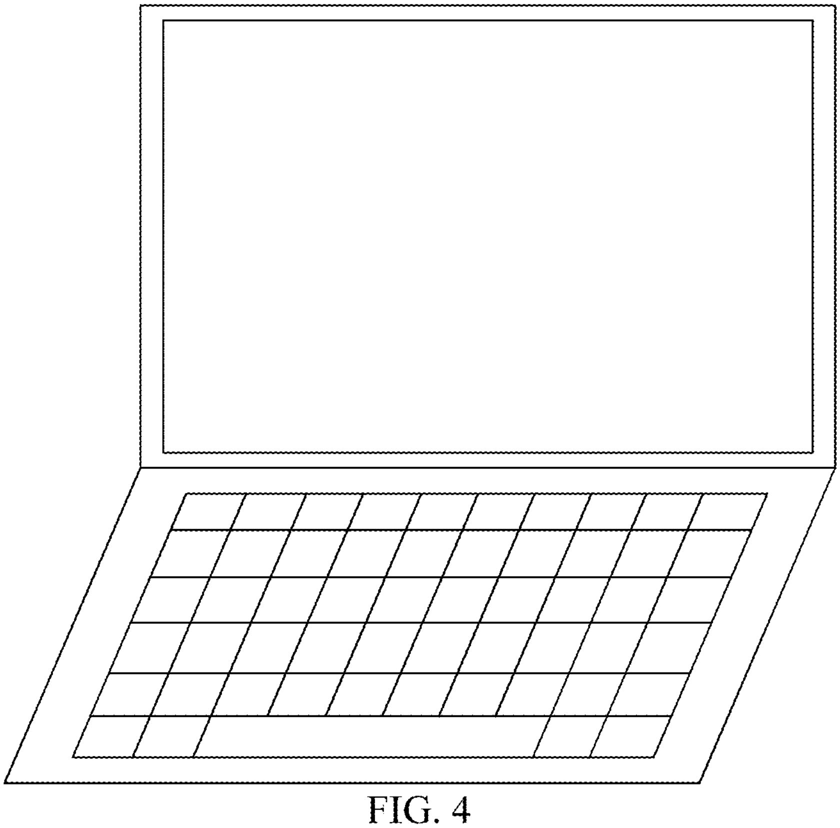
FIG. 4 is a schematic diagram of a structure of a display device according to an embodiment of the present disclosure.

FIG. 4 is a schematic diagram of a structure of a display device according to an embodiment of the present disclosure. An embodiment of the present disclosure further provides a display device including any one of the display modules described above.

Alternatively, the display device includes a mobile terminal (e.g., a mobile phone, a notebook computer, a tablet computer, a sports wristband, etc.), a fixed terminal (e.g., a television, a desktop computer, etc.).

The display module and display device provided by the present disclosure, by setting the selection module 300, enable the instructions stored in the first storage unit 401 and the second storage unit 402 of the storage module 400 to be executed by the control module 200 based on the selection control signal WP1 generated by the selection module 300, under different usage scenarios or fabrication scenarios. This allows for freedom from the influence of integrated COG, enabling consumers and display terminal manufacturers to freely choose whether to enable the sensing function of the display panel 100 based on their needs. This is beneficial for meeting the demands of consumers and display terminal manufacturers for different types of display modules, expanding the application scenarios of the display module, and reducing costs in production and procurement processes, etc.

It will be appreciated by those of ordinary skill in the art that all or a portion of the steps of the above-described methods may be performed by instructing relevant hardware (e.g., a processor) through a program. The program may be stored in a computer-readable storage medium, such as a read-only memory, magnetic disk, or optical disk, etc. Alternatively, all or a portion of the steps of the above embodiments may be implemented using one or more integrated circuits. Accordingly, each module/unit in the above embodiments may be implemented in the form of hardware, for example through an integrated circuit (e.g., CPLD, FPGA, SoC, etc.) to realize its corresponding function, or may be implemented in the form of software functional module(s), for example through a processor executing a program/instruction stored in a memory to realize its corresponding function. The present disclosure is not limited to any particular form of combination of hardware and software.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

The principles and implementations of the present disclosure have been elucidated with reference to specific embodiments, the description of which is merely intended to assist in understanding the method of the present disclosure and its core idea. Meanwhile, variations in the specific implementations and scope of application will occur to a person of ordinary skill in the art in accordance with the teachings of the present disclosure. In light of the foregoing, the specification is not to be construed as limiting the present disclosure.

What is claimed is:

1. A display module, comprising: a display panel;

a control module electrically connected to the display panel and configured to output a reference clock signal, a reference data signal, and a reference write protection signal;

a selection module electrically connected to the control module and configured to receive the reference write protection signal to output a selection control signal; and a storage module electrically connected to the selection module and the control module and including a first storage unit and a second storage unit, the storage module configured to receive the selection control signal;

wherein the control module is configured to select, based on the selection control signal, the reference clock signal, and the reference data signal, to execute one or more instructions stored in the first storage unit to enable a sensing function of the display panel, or to execute one or more instructions stored in the second storage unit to disable a sensing function of the display panel, wherein the selection module includes: a first switch, an input terminal of the first switch being electrically connected to a first power supply terminal, an output terminal of the first switch being electrically connected to a first node, and the first switch configured to connect or disconnect an electrical connection between the first power supply terminal and the first node based on the reference write protection signal; a first transistor, an input terminal of the first transistor being electrically connected to a second power supply terminal, an output terminal of the first transistor being electrically connected to the storage module, and a control terminal of the first transistor being electrically connected to the first node; a first resistor connected in series between the control terminal of the first transistor and the second power supply terminal; and a second resistor connected in series between the output terminal of the first transistor and the first power supply terminal, and wherein the selection control signal has a first level state under a condition that the first switch is opened and a second level state under a condition that the first switch is closed; wherein under a condition that the selection control signal has the first level state, the control module is configured to execute the instructions stored in the first storage unit to enable the sensing function of the display panel based on the reference clock signal and the reference data signal;

under a condition that the selection control signal has a second level state, the control module is configured to execute an instruction stored in the second storage unit to disable the sensing function of the display panel based on the reference clock signal and the reference data signal.

2. The display module of claim 1, further comprising a signal conversion module electrically connected between the control module and the storage module, the signal conversion module including:

a clock signal conversion unit configured to receive the reference clock signal to generate a first clock signal to be output to the first memory unit, and to generate a second clock signal to be output to the second memory unit; and a data signal conversion unit configured to receive the reference data signal to generate a first data signal to be output to the first storage unit, and to generate a second data signal to be output to the second storage unit.

3. The display module of claim 2, wherein the clock signal conversion unit includes:

a third resistor connected in series between the control module and the second node;

a fourth resistor connected in series between the second node and the first memory unit;

a fifth resistor connected in series between the second node and the second memory unit.

4. The display module of claim 2, wherein the data signal conversion unit includes:

a sixth resistor connected in series between the control module and a third node;

a seventh resistor connected in series between the third node and the first memory unit;

an eighth resistor connected in series between the third node and the second memory unit.

5. The display module of claim 1, wherein the first storage unit includes a first non-volatile memory that stores one or more instructions for enabling a touch-enabled function of the display panel;

the second storage unit includes a second non-volatile memory, and one or more instructions stored in the second non-volatile memory do not include the instructions for enabling the touch-enabled function of the display panel.

6. A control method for a display module, the display module comprising a display panel; a control module electrically connected to the display panel and configured to output a reference clock signal, a reference data signal, and a reference write protection signal; a selection module electrically connected to the control module and configured to receive the reference write protection signal to output a selection control signal; and a storage module electrically connected to the selection module and the control module and including a first storage unit and a second storage unit, the storage module configured to receive the selection control signal; wherein the control module is configured to select, based on the selection control signal, the reference clock signal, and the reference data signal, to execute one or more instructions stored in the first storage unit to enable a sensing function of the display panel, or to execute one or more instructions stored in the second storage unit to disable a sensing function of the display panel, wherein the control method comprising: outputting, by the selection module, a selection control signal based on the reference write protection signal generated by the control module;

executing, by the control module, the instructions stored in the first storage unit or the second storage unit to enable or disable the sensing function of the display panel based on the reference clock signal and the reference data signal generated by the control module and the selection control signal;

wherein the operation of executing, by the control module, the instructions the first storage unit or the second storage unit to enable or disable the sensing function of the display panel based on the reference clock signal and the reference data signal generated by the control module and the selection control signal includes:

executing, by the control module, the instructions stored in the first storage unit to enable the sensing function of the display panel based on the reference clock signal and the reference data signal under a condition that the selection control signal has a first level state;

executing, by the control module, the instructions stored in the second storage unit to disable the sensing function of the display panel based on the reference clock signal and the reference data signal under a condition that the selection control signal has a second level state.

7. A display device comprising a display module, the display module comprising: a display panel; a control module electrically connected to the display panel and configured to output a reference clock signal, a reference data signal, and a reference write protection signal; a selection module electrically connected to the control module and configured to receive the reference write protection signal to output a selection control signal; and a storage module electrically connected to the selection module and the control module and including a first storage unit and a second storage unit, the storage module configured to receive the selection control signal; wherein the control module is configured to select, based on the selection control signal, the reference clock signal, and the reference data signal, to execute one or more instructions stored in the first storage unit to enable a sensing function of the display panel, or to execute one or more instructions stored in the second storage unit to disable a sensing function of the display panel, wherein the selection module includes: a first switch, an input terminal of the first switch being electrically connected to a first power supply terminal, an output terminal of the first switch being electrically connected to a first node, and the first switch configured to connect or disconnect an electrical connection between the first power supply terminal and the first node based on the reference write protection signal; a first transistor, an input terminal of the first transistor being electrically connected to a second power supply terminal, an output terminal of the first transistor being electrically connected to the storage module, and a control terminal of the first transistor being electrically connected to the first node; a first resistor connected in series between the control terminal of the first transistor and the second power supply terminal; and a second resistor connected in series between the output terminal of the first transistor and the first power supply terminal, wherein the selection control signal has a first level state under a condition that the first switch is opened and a second level state under a condition that the first switch is closed; wherein under a condition that the selection control signal has the first level state, the control module is configured to execute the instructions stored in the first storage unit to enable the sensing function of the display panel based on the reference clock signal and the reference data signal; under a condition that the selection control signal has a second level state, the control module is configured to execute an instruction stored in the second storage unit to disable the sensing function of the display panel based on the reference clock signal and the reference data signal.

8. The display device of claim 7, further comprising a signal conversion module electrically connected between the control module and the storage module, the signal conversion module including: a clock signal conversion unit configured to receive the reference clock signal to generate a first clock signal to be output to the first memory unit, and to generate a second clock signal to be output to the second memory unit; and a data signal conversion unit configured to receive the reference data signal to generate a first data signal to be output to the first storage unit, and to generate a second data signal to be output to the second storage unit.

9. The display device of claim 8, wherein the clock signal conversion unit includes:

a third resistor connected in series between the control module and the second node;

a fourth resistor connected in series between the second node and the first memory unit;

a fifth resistor connected in series between the second node and the second memory unit.

10. The display device of claim 8, wherein the data signal conversion unit includes:

a sixth resistor connected in series between the control module and a third node;

a seventh resistor connected in series between the third node and the first memory unit;

an eighth resistor connected in series between the third node and the second memory unit.

11. The display device of claim 7, wherein the first storage unit includes a first non-volatile memory that stores one or more instructions for enabling a touch-enabled function of the display panel;

the second storage unit includes a second non-volatile memory, and one or more instructions stored in the second non-volatile memory do not include the instructions for enabling the touch-enabled function of the display panel.

* * * * *